United States Patent
Chapman

[15] 3,660,210
[45] May 2, 1972

[54] STATIC AUTOGENOUS SEALING BAR

[72] Inventor: Harry Samuel Chapman, R.D. 3, P.O. Box 224A, Hickory Hill, Pa. 19363

[22] Filed: May 13, 1969

[21] Appl. No.: 824,211

[52] U.S. Cl. ................................................ 156/583, 156/84
[51] Int. Cl. ............................................................ B30b 15/34
[58] Field of Search ................. 174/127; 138/156, 128, 170, 138/172, 176; 156/515, 580, 583, 84

[56] References Cited

UNITED STATES PATENTS

| | | | |
|---|---|---|---|
| 2,565,161 | 8/1951 | Wilmotte et al. | 156/580 X |
| 3,015,601 | 1/1962 | Fener | 156/515 |
| 3,179,632 | 4/1965 | Hendrix | 260/78 |
| 3,179,635 | 4/1965 | Frost et al. | 260/78 |
| 3,386,503 | 6/1968 | Corning et al. | 156/583 X |
| 3,409,494 | 11/1968 | Korzinek | 156/515 |

Primary Examiner—Benjamin A. Borchelt
Assistant Examiner—Daniel Bent
Attorney—Low and Matthews

[57] ABSTRACT

A static sealer bar is provided for heat-sealing organic polymeric materials, especially fluorocarbon films; the static sealer bar is characterized by a base member of, for example, asbestos material having a heating element disposed in a slot or recess extending substantially the entire length of one face of the base member; the slotted surface of the base member is covered by a layer of polyimide film which is, in turn, covered by a layer of silicone rubber film, and the silicone rubber film is preferably covered by a layer of polyimide. A method for heat-sealing fluorocarbon films in situ on large diameter rolls utilizing the static sealer bar also is provided.

8 Claims, 3 Drawing Figures

PATENTED MAY 2 1972 3,660,210

INVENTOR
HARRY SAMUEL CHAPMAN
BY
ATTORNEYS

STATIC AUTOGENOUS SEALING BAR

THE INVENTION

The present invention relates to a method and device for heat-sealing organic thermoplastic polymeric materials and, more particularly, is directed to a novel sealing device and method for heat-sealing film structures of fluorocarbon polymeric material.

The heat-sealing of organic thermoplastic polymeric materials by the application of heat and pressure is a well known method for uniting such materials to provide integral structures thereof such as, for example, tubular film structures. For instance, a flat sheet, web or film structure of organic thermoplastic material may be formed into a tubular structure by contacting two opposed edges thereof in either abutting or overlapping relation and heat-sealing or welding the polymeric material along the line of contact thereof as by the application of suitable heat and pressure thereto to effect fusion and joining of the polymeric material thereat. The foregoing heat-sealing technique is especially useful for forming large tubular film structures of heat-shrinkable polymeric materials that are adapted to be installed upon large roller elements and heat-shrunk thereon to provide a covering on such rolls of such suitable and desirable polymeric material. For example, each of U.S. Pat. Nos. 3,426,118 and 3,426,119 discloses a method for applying a tubular film of fluorinated ethylene polymeric resin onto the surface of large diameter rollers by heat-shrinking an integral tubular film thereon wherein the tubular film was fabricated from a flat sheet of polymeric resin by abutting two opposed edges of the flat sheet and applying heat and pressure to the region of the abutting film edges whereby to fuse and join the polymeric material thereat and provide a tubular film structure. One major drawback and disadvantage of the heat-sealing apparatus and method described in the aforementioned patents resides in the impracticability thereof for forming a tubular film structure from a flat film structure in situ on a large diameter roller element.

According to the present invention there is provided a method for heat-sealing tubular film structures of organic polymeric material in situ on large diameter roll structures which comprises wrapping a flat film or sheet of heat-shrinkable organic polymeric material, preferably of fluorocarbon polymeric material, around said roll structure; contacting opposed edges of said film; maintaining said opposed edges secured in firm contact in a static sealer bar and heating said static sealer bar thereby to heat said contacting opposed edges of said film and fuse and join the same whereby to form a unitary tubular film structure which circumscribes said roll structure; and thereafter applying heat to said tubular film structure thereby to shrink said tubular film structure into intimate contact with the surface of said roll structure for providing a covering on the surface of said roll structure.

According to the present invention there is further provided a heat-sealing device, hereinafter referred to as a static sealer bar, comprising a body or base member having a recess on one surface thereof, said recess extending substantially the entire length of said surface; and electrical resistance-type heating element disposed in said recess; a first layer of high temperature resistant material overlying said surface of said base member; a layer of high temperature resistant elastomeric-type material overlying the exposed surface of said first layer of high temperature resistant material; and preferably a second layer of high temperature resistant material overlying the exposed surface of said layer of high temperature resistant elastomeric-type material. In one embodiment of the static sealer bar of the invention, the layer of high temperature resistant elastomeric-type material is replaced by a thin metallic band preferably of stainless steel. This latter embodiment of the static sealer bar is especially useful for heat-sealing thin film structures of polymeric material, e.g., film structures that are below about 10 mils in thickness.

The nature and advantages of the method and static sealer bar of the present invention will be more clearly understood from the following description and the several views illustrated in the accompanying drawings wherein like reference characters refer to the same parts throughout the several views and in which.

Figure 1:
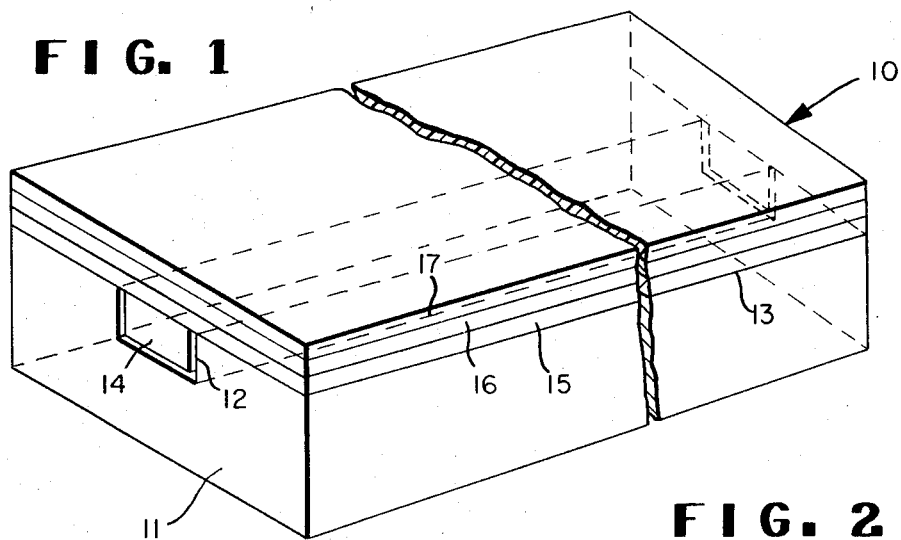
FIG. 1 is a perspective view of one embodiment of the static sealer bar of the invention.
Figure 2:
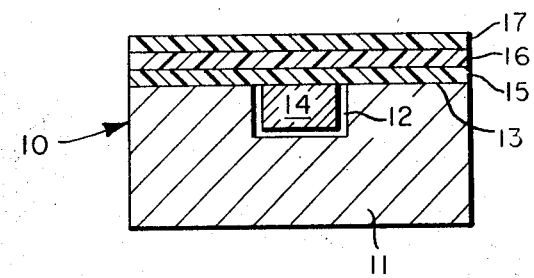
FIG. 2 is a cross-sectional view of the static sealer bar shown in FIG. 1.

The static sealer bar 10 (FIGS. 1 and 2) herein disclosed in illustration of the invention includes a body portion 11 of a material having good insulative properties such as, for example, hard asbestos board. A suitable material is available commercially under the designation TRANSITE, manufactured by Philip Carey Corp., Cincinnati, Ohio. The body 11 of static sealer bar 10 is provided with a recessed portion or slot 12 on one surface 13 thereof which preferably extends the entire length of body 11. Slot 12 is adapted to accommodate an electrical resistance-type heater element 14 of sufficient heating capacity to heat and fuse organic polymeric material, as hereinafter more fully described. A heater element having an electrical heating capacity of 6 watts per lineal inch has been found to be satisfactory; such an element is available from the Brisloe Manufacturing Company of Columbus, Ohio. The static sealer bar is further characterized by a covering or layer 15 of high temperature resistant material which is secured by any suitable means to surface 13 of body 11. Suitable material for layer 15 is a film structure of preferably about 5 mils thickness of high temperature resistant material such as, for example, polyimide polymeric material described in, for example, U.S. Pat. Nos. 3,179,632; 3,179,633 and 3,179,634. Such polyimides are characterized by the following recurring structural unit:

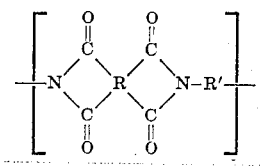

wherein R is a tetravalent radical containing at least one ring of six carbon atoms, said ring characterized by benzenoid unsaturation, the four carbonyl groups being attached directly to separate carbon atoms and each pair of carbonyl groups being attached to adjacent carbon atoms in a six-membered benzenoid ring of the R radical; and wherein R' is a divalent organic radical containing at least two carbon atoms. The polyimides are obtained by reacting at least one organic diamine having the structural formula $H_2N-R'-NH_2$ with at least one tetracarboxylic acid dianhydride having the structural formula

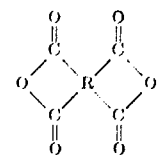

wherein R and R' are defined hereinabove.

The static sealer bar of the invention also has a layer or covering 16 of high temperature resistant elastomeric-type material which is secured by any suitable means to the exposed surface of layer 15. Suitable materials for layer 16 is a film structure of preferably up to about 40 mils thickness of high temperature resistant material such as silicone, fluoroelastomers (such as VITON manufactured by E. I. du Pont de Nemours and Company, Inc.), etc. The static sealer bar also is provided with a layer 17 of high temperature resistant material which is secured by any suitable means to the exposed surface of layer 16. Suitable material for layer 17 is a film structure of preferably about 5 mils thickness of high temperature resistant material utilized for layer 15, e.g., polyimides. The static sealer bar of the invention is provided with suitable electrical connectors (not shown) adapted for connecting the heater element of the static sealer bar to a suitable source of electric power.

Figure 3:
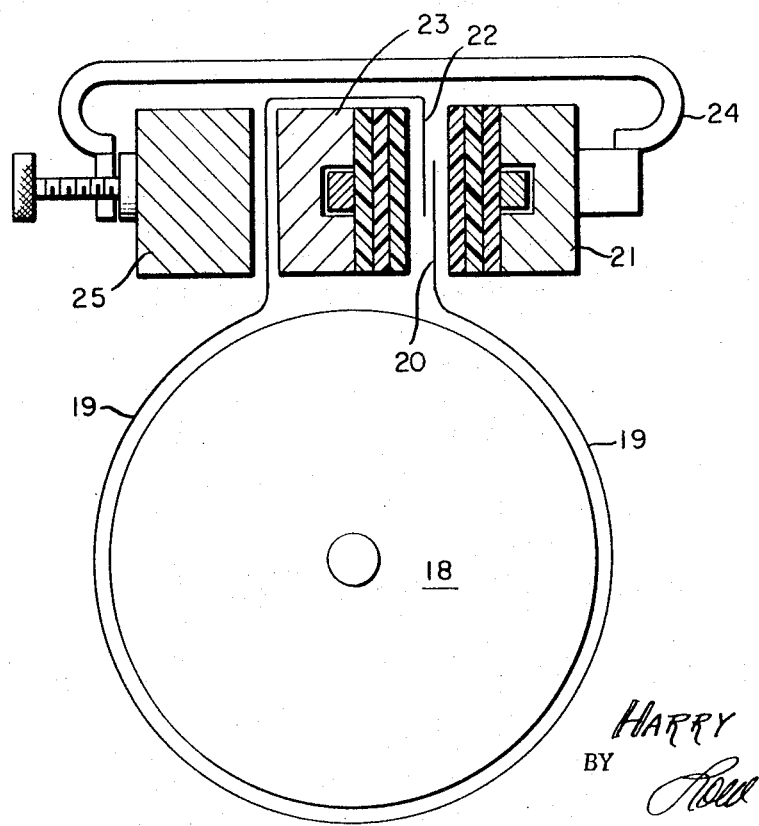
FIG. 3 is a cross-sectional view illustrating the method of the present invention for heat-sealing a flat film in situ on a large diameter roll utilizing the static sealer bars of FIGS. 1 and 2.

The static sealer bars of the invention are especially adapted for heat-sealing flat film or sheet structures of polymeric material in situ on large diameter roll structures. The procedure is depicted schematically in FIG. 3 which depicts a roll structure 18 having a flat film or sheet 19 of heat-shrinkable polymeric material such as fluorocarbon polymer wrapped therearound. As shown in FIG. 3, one end 20 of film 19 passes under a static sealer bar 21, whereas the other end 22 of film 19 passes over a static sealer bar 23 and the edges of the film 19 are overlapped slightly and firmly secured in intimate contact between static sealer bars 21 and 23. A useful technique for maintaining the edges of film 19 in overlapped relation is to spot weld the overlapped film along the region of overlap. This may readily be done with an electric resistance-heated soldering gun, and is very advantageous for maintaining the overlapped film in proper alignment between the static sealer bars.

Static sealer bars 21 and 23 exert or transmit a pressure force to the film 19 held therebetween; the pressure force is provided by any suitable means such as a clamping device 24. FIG. 3 also shows the use of a protective element 25 of any suitable material such as wood or metal which is interposed between static sealer bar 23 and clamp 24 and which provides a surface for contacting clamp 24 thereby protecting the surface of film 19. After installing the film 19 and static sealer bar assembly (bars 21, 23, clamp 24 and protective element 25) on a roll such as 18, the static sealer bars are electrically energized thereby to heat the polymeric material in the region of film 19 that is secured therebetween. The heating is continued for a time sufficient to effect plastic flow of the polymeric material and to obtain fusion of the polymeric material in the region of the film 19 that is held between static sealer bars 21 and 23. The time for heating will depend of course upon such factors as the thickness of the film structure 19 and may readily be determined by anyone skilled in the art. Ordinarily, heating times of about 10 minutes and about 25 minutes are satisfactory when utilizing fluorocarbon polymer films 19 of about 10 and about 20 mils thickness, respectively. Thereafter, the static sealer bars are de-energized and the film 19 held therebetween is allowed to cool while being maintained under pressure. After cooling, the static sealer bars are removed and the unitary tubular film enwrapped on roll 18 is heat-shrunk on roll 18 in the conventional manner by applying heat thereto as described in U.S. Pat. Nos. 3,426,118 and 3,426,119.

One important embodiment of the static sealer bar of the present invention is that wherein the layer of high temperature resistant elastomeric-type material described hereinbefore is replaced with a metallic band of preferably stainless steel. Thus, in this instance the surface of the static heater bar is characterized by a layer of, for example, polyimide film, the metallic band and a top surface of polyimide film; that is, the metallic band is disposed intermediate two polyimide layers. This embodiment of the static sealer bar is especially useful for heat sealing polymeric materials such as fluorocarbon polymeric materials that are relatively thin as, for example, below about 10 mils thickness. It is believed that the metallic band in this embodiment of the static sealer bar is effective to dissipate the heat provided by the heating element more effectively and over a greater area thereby reducing the heat flux at the very line of contact of the polymeric material being sealed. The net result is a more efficient and effective heat sealing of the polymeric material substantially eliminating burn-through spots or degraded material otherwise and obtained when too great a heat flux is transmitted to a very localized area of the thin film structures being heat-sealed.

It should be emphasized that the static sealing bars of the present invention are not restricted to heat-sealing tubular film structures in situ on large diameter roll structures, since it may readily be seen that the static sealing bars of the invention may be utilized, for example, for heat-sealing several separate flat sheets or films together for obtaining yet larger but unitary flat films. In this instance, two edges of either one or two film structures are aligned together and secured in firm contact under pressure between static sealing bars and heat-sealed together as above described. The fused and joined edges of the one or several film structures are thereafter cooled under pressure between the static sealing bars. The static sealing bars of the invention are, however, especially useful for heat-sealing tubular film structures in situ on large diameter roll structures, since a very important and significant advantage of the static sealing bars is that they do not utilize any moving parts or elements. Another significant advantage of the sealer bar of the invention is that flat film structures of polymeric materials may be heat-sealed in situ on large diameter roll structures for providing tubular films which may be heat-shrunk onto the surface of such rolls. These advantages provide consistently better quality heat seals characterized by a substantially uniform surface which is not distinct or otherwise distinguishable from the surface of the polymeric film material in general.

The preferred polymeric material utilized in the method of the present invention is a fluorocarbon polymer. The expressions "fluorocarbon polymer" and "fluorocarbon polymeric material" as used herein mean copolymers of tetrafluoroethylene and hexafluoropropylene (FEP). The fluorocarbon polymers are extensively described in such patents as, for example, U.S. Pat. Nos. 2,833,686, 2,946,763 and 3,051,683.

What is claimed is:

1. A static sealer bar construction for thermally sealing fluorocarbon polymer materials comprising:
   a. an elongated body having thermally and electrically insulative properties,
   b. said body having an elongated recess therein along one surface thereof,
   c. an electrical resistance heating element disposed in said recess,
   d. a first layer of high temperature-resistant material overlying said body surface and said heating element recessed therein,
   e. an intermediate layer of high temperature resistant material overlying said first layer of a material different from that of said first layer, and,
   f. a release layer of high temperature resistant material overlying said intermediate layer.

2. The static sealer bar of claim 1 wherein said body is of hard asbestos material.

3. The static sealer bar of claim 2 wherein said first layer of high temperature resistant material is of polyimide polymeric material.

4. The static sealer bar of claim 3 wherein said intermediate layer of high temperature resistant elastomeric-type material is of silicone elastomeric material.

5. The static sealer bar of claim 1 wherein said release layer of high temperature resistant material is of polyimide polymeric material.

6. The static sealer bar of claim 1 wherein said first and release layers of high temperature resistant material are of polyimide polymeric material.

7. The static sealer bar of claim 1 wherein said intermediate layer comprises a metallic band.

8. The static sealer bar of claim 7 wherein said metallic band is of stainless steel.

* * * * *